United States Patent
Zhou et al.

(10) Patent No.: US 12,452,014 B2
(45) Date of Patent: Oct. 21, 2025

(54) METHOD AND APPARATUS FOR DETERMINING REFERENCE SIGNAL ELECTRONIC DEVICE AND STORAGE MEDIUM

(71) Applicant: Spreadtrum Communications (Shanghai) Co., Ltd., Shanghai (CN)

(72) Inventors: Huayu Zhou, Shanghai (CN); Zhengang Pan, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 635 days.

(21) Appl. No.: 17/909,254

(22) PCT Filed: Mar. 4, 2021

(86) PCT No.: PCT/CN2021/079071
§ 371 (c)(1),
(2) Date: Sep. 2, 2022

(87) PCT Pub. No.: WO2021/139833
PCT Pub. Date: Jul. 15, 2021

(65) Prior Publication Data
US 2023/0087737 A1    Mar. 23, 2023

(30) Foreign Application Priority Data

Jan. 9, 2020 (CN) .......................... 202010023643.3
Mar. 4, 2020 (CN) .......................... 202010143904.5

(51) Int. Cl.
*H04L 5/00*    (2006.01)
*H04W 24/08*    (2009.01)
(Continued)

(52) U.S. Cl.
CPC ............ *H04L 5/0051* (2013.01); *H04W 24/08* (2013.01); *H04W 56/001* (2013.01); *H04W 68/02* (2013.01); *H04W 72/23* (2023.01)

(58) Field of Classification Search
CPC ... H04L 5/0048; H04L 5/0051; H04L 5/0094; H04W 24/02; H04W 24/08;
(Continued)

(56) References Cited

U.S. PATENT DOCUMENTS 10,149,288 B2 * 12/2018 Kim ...................... H04W 72/23
10,506,472 B2 * 12/2019 Rico Alvarino ...... H04W 28/16
(Continued)

FOREIGN PATENT DOCUMENTS

CN    108696346 A    10/2018
CN    108989008 A    12/2018
(Continued)

OTHER PUBLICATIONS

The second Office Action issued by the China National Intellectual Property Administration (CNIPA) on Feb. 24, 2023 for the Chinese Patent Application No. 202010143904.5.
(Continued)

*Primary Examiner* — Eric Nowlin
(74) *Attorney, Agent, or Firm* — MASCHOFF BRENNAN; Paul G. Johnson

(57) ABSTRACT

The present disclosure provides a method and apparatus for determining a reference signal, and an electronic device and a storage medium, where configuration information is acquired; and it is determined that whether a reference signal is valid according to the configuration information. Determination of whether the reference signal is valid is implemented through the configuration information. Furthermore, the UE only needs to be waken up before a last synchronization signal block before a PO, and implements AGC
(Continued)

adjustment, channel tracking and measurement through the last synchronization signal block and the reference signal.

19 Claims, 5 Drawing Sheets

(51) Int. Cl.
*H04W 56/00* (2009.01)
*H04W 68/02* (2009.01)
*H04W 72/23* (2023.01)

(58) Field of Classification Search
CPC ........... H04W 52/0229; H04W 56/001; H04W 68/02; H04W 72/23; H04W 76/27; H04W 76/28; Y02D 30/70
See application file for complete search history.

(56) References Cited

U.S. PATENT DOCUMENTS

| | | | | |
|---|---|---|---|---|
| 10,887,864 B2* | 1/2021 | Agiwal | | H04W 76/28 |
| 10,932,149 B2* | 2/2021 | Ananda | | H04W 68/00 |
| 11,202,259 B2* | 12/2021 | Ji | | H04W 68/005 |
| 11,229,009 B2* | 1/2022 | Charbit | | H04W 84/022 |
| 11,343,792 B2* | 5/2022 | Phan | | H04W 74/0816 |
| 11,382,055 B2* | 7/2022 | Liu | | H04W 68/02 |
| 11,456,831 B2* | 9/2022 | Si | | H04L 5/0094 |
| 11,470,574 B2* | 10/2022 | Chen | | H04W 68/00 |
| 11,533,767 B2* | 12/2022 | Axmon | | H04W 72/0446 |
| 11,540,251 B2* | 12/2022 | Shi | | H04W 52/0245 |
| 11,729,731 B2* | 8/2023 | Yang | | H04W 68/00 370/311 |
| 11,778,552 B2* | 10/2023 | Ang | | H04W 68/005 370/311 |
| 11,936,582 B2* | 3/2024 | He | | H04W 52/0235 |
| 12,004,171 B2* | 6/2024 | Harada | | H04W 72/23 |
| 12,068,993 B2* | 8/2024 | Lin | | H04W 68/02 |
| 12,088,450 B2* | 9/2024 | Han | | H04L 5/001 |
| 12,185,241 B2* | 12/2024 | Ang | | H04W 72/1273 |
| 12,335,867 B2* | 6/2025 | Elkotby | | H04W 52/0225 |
| 2015/0133151 A1* | 5/2015 | Jung | | H04W 24/02 455/456.1 |
| 2015/0264669 A1* | 9/2015 | Kim | | H04L 5/0048 370/329 |
| 2016/0344526 A1* | 11/2016 | Fan | | H04W 72/21 |
| 2018/0124644 A1* | 5/2018 | Rico Alvarino | | H04W 52/0209 |
| 2019/0174571 A1* | 6/2019 | Deenoo | | H04W 68/02 |
| 2019/0261444 A1* | 8/2019 | Axmon | | H04W 76/28 |
| 2019/0313268 A1* | 10/2019 | Ananda | | H04W 68/00 |
| 2019/0373577 A1* | 12/2019 | Agiwal | | H04W 68/02 |
| 2019/0394749 A1* | 12/2019 | Islam | | H04W 80/02 |
| 2020/0053695 A1* | 2/2020 | Charbit | | H04W 84/022 |
| 2020/0084747 A1* | 3/2020 | Hong | | H04W 72/23 |
| 2020/0145918 A1* | 5/2020 | Ji | | H04W 52/0229 |
| 2020/0177336 A1* | 6/2020 | Li | | H04W 72/54 |
| 2020/0267024 A1* | 8/2020 | Baldemair | | H04L 5/0094 |
| 2020/0287678 A1* | 9/2020 | Li | | H04W 72/23 |
| 2020/0304260 A1* | 9/2020 | Si | | H04W 48/12 |
| 2021/0044471 A1* | 2/2021 | Zhou | | H04J 11/0086 |
| 2021/0153162 A1* | 5/2021 | Chen | | H04W 56/001 |
| 2021/0243704 A1* | 8/2021 | Liu | | H04W 68/005 |
| 2021/0314117 A1* | 10/2021 | Wang | | H04L 5/0053 |
| 2021/0314910 A1* | 10/2021 | Rune | | H04L 5/0094 |
| 2021/0321330 A1* | 10/2021 | Ang | | H04W 72/1273 |
| 2021/0337502 A1* | 10/2021 | Phan | | H04W 8/005 |
| 2021/0385800 A1* | 12/2021 | Harada | | H04L 5/0048 |
| 2022/0104174 A1* | 3/2022 | Liu | | H04W 68/02 |
| 2022/0217034 A1* | 7/2022 | Han | | H04L 5/0053 |
| 2022/0271878 A1* | 8/2022 | Lin | | H04W 68/02 |
| 2023/0037852 A1* | 2/2023 | Islam | | H04L 5/0094 |
| 2023/0051117 A1* | 2/2023 | Tsai | | H04L 5/0094 |
| 2023/0087737 A1* | 3/2023 | Zhou | | H04L 5/0094 370/329 |
| 2023/0156723 A1* | 5/2023 | Zhou | | H04L 5/0053 370/329 |
| 2023/0208587 A1* | 6/2023 | He | | H04W 52/0232 370/329 |
| 2023/0224811 A1* | 7/2023 | Xu | | H04W 56/0035 370/311 |
| 2023/0388077 A1* | 11/2023 | Maleki | | H04W 76/27 |
| 2023/0412341 A1* | 12/2023 | Jung | | H04W 68/02 |
| 2024/0073817 A1* | 2/2024 | Ang | | H04W 72/1273 |
| 2024/0080766 A1* | 3/2024 | Zhou | | H04W 52/0229 |
| 2024/0098697 A1* | 3/2024 | Peng | | H04W 72/232 |
| 2024/0129817 A1* | 4/2024 | Nagano | | H04W 48/16 |
| 2024/0147485 A1* | 5/2024 | Hasanzadezonuzy | | H04W 76/28 |
| 2024/0154757 A1* | 5/2024 | Nagano | | H04L 5/0053 |
| 2024/0163845 A1* | 5/2024 | Lei | | H04L 5/0053 |
| 2024/0214144 A1* | 6/2024 | He | | H04W 52/0235 |
| 2024/0284406 A1* | 8/2024 | Li | | H04W 52/0216 |
| 2024/0313911 A1* | 9/2024 | Nimbalker | | H04W 72/232 |
| 2024/0340207 A1* | 10/2024 | Baldemair | | H04L 5/0051 |
| 2024/0357499 A1* | 10/2024 | Zhou | | H04W 52/0235 |
| 2024/0380552 A1* | 11/2024 | Wang | | H04W 48/12 |
| 2025/0048333 A1* | 2/2025 | Fu | | H04W 68/02 |
| 2025/0055529 A1* | 2/2025 | Ma | | H04L 5/0048 |
| 2025/0056565 A1* | 2/2025 | Guo | | H04W 72/232 |
| 2025/0141644 A1* | 5/2025 | Jung | | H04W 72/1273 |
| 2025/0175293 A1* | 5/2025 | Li | | H04L 5/0048 |

FOREIGN PATENT DOCUMENTS

| | | | | |
|---|---|---|---|---|
| CN | 109391986 A | | 2/2019 | |
| CN | 109587786 A | | 4/2019 | |
| CN | 109756315 A | | 5/2019 | |
| CN | 110226351 A | | 9/2019 | |
| CN | 110557234 A | | 12/2019 | |
| CN | 111867017 A | | 10/2020 | |
| CN | 112075049 B | * | 10/2023 | ........... H04L 5/0048 |
| EP | 4027738 A1 | * | 7/2022 | ........... H04B 7/2656 |
| EP | 4027738 B1 | * | 1/2024 | ........... H04B 7/2656 |
| JP | 7224420 B2 | * | 2/2023 | ........... H04B 17/336 |
| WO | 2018175840 A1 | | 9/2018 | |
| WO | WO-2019029330 A1 | * | 2/2019 | ............ H04L 5/001 |
| WO | WO-2022082459 A1 | * | 4/2022 | .......... H04W 56/001 |

OTHER PUBLICATIONS

International Search Report and Written Opinion of the International Searching Authority for PCT/CN2021/079071, mailed on Jun. 2, 2021 (English translation also attached).
The first Office Action for the corresponding Chinese Patent Application No. 202010143904.5, issued on Jul. 5, 2022, with English translation.
Vivo, "Remaining aspects of PDCCH-based power saving signal", 3GPP, Nov. 22, 2019 (R1-1912049).
Huawei, Hisilicon "PDCCH-based power saving signal/channel", 3GPP, Oct. 20, 2019 (R1-1910076).

* cited by examiner

METHOD AND APPARATUS FOR DETERMINING REFERENCE SIGNAL ELECTRONIC DEVICE AND STORAGE MEDIUM

CROSS-REFERENCE TO RELATED APPLICATIONS

The present application is a national stage of International Application No. PCT/CN2021/079071, filed on Mar. 4, 2021, which claims priority to Chinese patent application No. 202010023643.3, filed on Jan. 9, 2020, and Chinese patent application No. 202010143904.5, filed on Mar. 4, 2020. All of the aforementioned patent applications are hereby incorporated by reference in their entireties.

TECHNICAL FIELD

The present disclosure relates to the field of communication technology, and in particular, to a method and apparatus for determining a reference signal, an electronic device and a storage medium.

BACKGROUND

When a user equipment (UE) is in an idle mode (Idle Mode, RRC IDLE), the UE needs to monitor a paging physical downlink control channel (PDCCH) used for carrying paging information, to determine whether there is paging information sent to the UE itself. At present, the UE relies on a synchronization signal block or a synchronization signal block burst to perform automatic gain control (AGC) adjustment, and channel tracking, etc. The synchronization signal block is sent by a network equipment (network device) periodically, and hence, the UE needs to be waken up at least in a last synchronization signal block or synchronization signal block burst before a paging occasion (PO), and uses the last synchronization signal block or synchronization signal block burst to perform AGC adjustment and channel tracking (including time and frequency synchronization).

SUMMARY

The present disclosure provides a method and apparatus for determining a reference signal, an electronic device and a storage medium, to implement determination of whether the reference signal is valid.

In a first aspect, an embodiment of the present disclosure provides a method for determining a reference signal, including:
acquiring configuration information; determining whether a reference signal is valid according to the configuration information.

In a second aspect, an embodiment of the present disclosure provides an apparatus for determining a reference signal, including:
at least one processor; and
a memory communicatively connected to the at least one processor; wherein
the memory stores an instruction executable by the at least one processor, and the instruction is executed by the at least one processor to cause the at least one processor to:
acquire configuration information; determine whether the reference signal is valid according to the configuration information.

In a third aspect, an embodiment of the present disclosure provides an electronic device, including:
at least one processor; and
a memory communicatively connected to the at least one processor; where
the memory stores an instruction executable by the at least one processor, and the instruction is executed by the at least one processor to cause the at least one processor to execute the method provided by the first aspect or possible implementations of the first aspect.

In a fourth aspect, an embodiment of the present disclosure provides a non-transitory computer-readable storage medium storing a computer instruction, where the computer instruction is used to cause a computer to execute the method provided by the first aspect or possible implementations of the first aspect.

In a fifth aspect, an embodiment of the present disclosure provides a computer program product, including: an executable instruction used to implement the method provided by the first aspect or possible implementations of the first aspect.

In the method for determining a reference signal and apparatus, and the electronic device and the storage medium provided by the embodiment of the present disclosure, configuration information is acquired; and it is determined that whether a reference signal is valid according to the configuration information. Determination of whether the reference signal is valid is implemented through the configuration information. Furthermore, the UE only needs to be waken up before a last synchronization signal block or synchronization signal block burst before a PO, and implements AGC adjustment and channel tracking (or AGC adjustment, channel tracking and measurement) through the last synchronization signal block (or synchronization signal block burst) and the reference signal.

BRIEF DESCRIPTION OF DRAWINGS

In order to more clearly describe the embodiments of the present disclosure or the technical solutions, in the following, the drawings used in the description of the embodiments will be briefly introduced. Obviously, the drawings in the following description are some embodiments of the present disclosure, and for those of ordinary skills in the art, other drawings can be obtained according to these drawings without making any creative effort.

DESCRIPTION OF EMBODIMENTS

Figure 1:
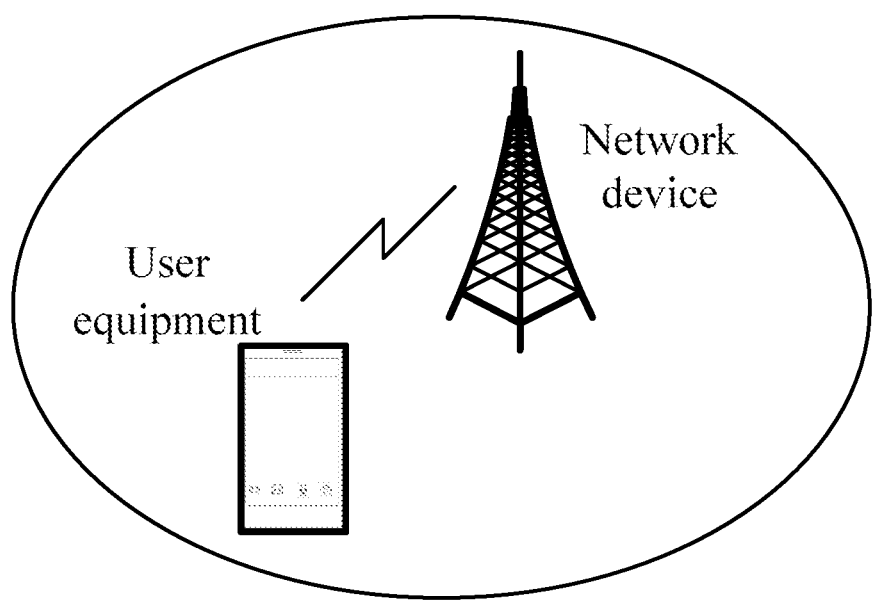
FIG. 1 is a schematic diagram of an exemplary application scenario of an embodiment of the present disclosure.

In order to make the purpose, technical solution and advantages of the embodiments of the present disclosure clearer, the technical solution in the embodiment of the present disclosure will be clearly and fully described below with reference to the drawings in the embodiment of the present disclosure. Obviously, the described embodiments are a part of the embodiments of the present disclosure, but not all embodiments. Based on the embodiments in the present disclosure, all other embodiments obtained by those of ordinary skills in the art without making creative efforts belong to the scope of protection in the present disclosure.

The terms "first", "second", "third" and "fourth" in the specification and claims of the present disclosure and the above drawings, if any, are used to distinguish similar objects, and are not necessarily used to describe a specific order or sequence. It should be understood that the data used in this way can be interchanged under appropriate situations, so that the embodiments of the present disclosure described here can be implemented, for example, in a sequence other than those illustrated or described here. In addition, the terms "including" and "comprising" and any variations thereof are intended to cover non-exclusive inclusion. For example, a process, a method, a system, a product or a device that includes a series of steps or units is not necessarily limited to those steps or units that are clearly listed, but may include other steps or units that are not clearly listed or inherent to the process, method, product or device.

When a UE is in an idle state (RRC IDLE, or idle mode), the UE needs to monitor a paging PDCCH used to carrying paging information, to determine whether there is paging information sent to the UE itself. At present, the UE relies on a synchronization signal block to perform AGC adjustment, and channel tracking, etc. When the UE has experienced a long sleep, for example, an interval between two POs that the UE needs to monitor is large due to PO configuration, the UE may need to be waken up before the last two synchronization signal blocks or synchronization signal block bursts before the PO, and use two synchronization signal blocks or synchronization signal block bursts to perform AGC adjustment and channel tracking respectively, or use two synchronization signal blocks or synchronization signal block bursts to perform AGC adjustment/channel tracking and measurement respectively. Therefore, it will be caused that the time period during which the UE is waken up in advance is too long and more power is consumed. In this case, an additional reference signal may be added to reduce the time period during which the UE is waken up in advance. However, introduction of the additional reference signal may increase system overhead. Therefore, it is best for a base station to send the reference signal only in some certain moments, and correspondingly, the UE needs to determine when the reference signal is valid. How to determine the valid reference signal is an urgent problem to be addressed. To solve the above technical problem, an embodiment of the present disclosure provides a method and apparatus for determining a reference signal, an electronic device and a storage medium.

In the embodiment of the present disclosure, by implementing determination of whether the reference signal is valid through the configuration information, system overhead is optimized. Furthermore, the UE only needs to be waken up before a last synchronization signal block or synchronization signal block burst before a PO, and implements AGC adjustment and channel tracking (or AGC adjustment, channel tracking and measurement) through the last synchronization signal block (or synchronization signal block burst) and the reference signal, thus effectively reducing a time period during which the UE is waken up in advance, thereby realizing common optimization of power saving of the UE and system overhead. The embodiment of the present disclosure does not limit specific implementation ways of how to implement AGC adjustment and channel tracking according to the reference signal and the synchronization signal block (or synchronization signal block burst). For example, the UE can perform AGC adjustment through a last synchronization signal block (or synchronization signal block burst), so as to receive subsequent signals (including the reference signal) by using a suitable dynamic range, to avoid saturation or overflow of signals. Then, the UE can reach the purpose of channel tracking by processing the reference signal, including estimation and compensation of a time-frequency offset, to achieve time-frequency synchronization with a base station. For another example, the UE can perform AGC adjustment and channel tracking through a last synchronization signal block (or synchronization signal block burst), so as to receive subsequent signals (including the reference signal) by using a suitable dynamic range, to avoid saturation or overflow of signals, and reach the purpose of channel tracking, including estimation and compensation of the time-frequency offset. Then, the UE can reach the purpose of measurement by measuring the reference signal (including RRM measurement and/or RLM measurement). As described above, the reference signal can either be used for channel tracking, or be used for measurement. The reference signal can be a tracking reference signal (TRS), a channel state information-reference signal (CSI-RS) or a synchronization signal (SS). The reference signal may also be other types of signals. The reference signal may be used for mobile or radio resource management (RRM)/radio link monitoring (RLM) measurement, hence it might be a CSI-RS for mobility or a CSI-RS for RRM/RLM measurement. The CSI-RS for mobility or the CSI-RS for RRM/RLM measurement may be a NZP CSI-RS resource (Non-zero Power CSI-RS resource). The reference signal may be used for a function of channel tracking, hence it might be a TRS. The TRS may be an NZP-CSI-RS-ResourceSet (Non-zero Power CSI-RS resource set), and one NZP-CSI-RS-ResourceSet may include 4 NZP CSI-RS resources in two consecutive slots, and there are two NZP CSI-RS resources in each slot. The TRS may be periodic, or may be non-periodic. When the TRS is periodic, the NZP CSI-RS resources in the NZP-CSI-RS-ResourceSet have the same period, bandwidth and sub-carrier position. When the TRS is non-periodic, the periodic CSI-RS resource is in a NZP-CSI-RS-ResourceSet, and the non-periodic CSI-RS resource is in another NZP-CSI-RS-ResourceSet, and the periodic CSI-RS resource and the non-periodic CSI-RS resource have the same bandwidth (the same position of resource block), and the non-periodic CSI-RS resource and the periodic CSI-RS are QCL-Type-A (Quasi Colocation Type-A) and QCL-Type-D (Quasi Colocation Type-D).

The synchronization signal block (Synchronization Signal/Physical Broadcast Channel Block, SS/PBCH Block, SSB) is a signal structure defined in new radio (NB), which includes a primary synchronization signal (PSS), a secondary synchronization signal (SSS) and a physical broadcast channel (PBCH), where the main function of the PSS and the SSS is to facilitate a UE to identify a cell and synchronize with the cell, and the PBCH includes most basic synchronization information, such as a system frame number, intra-frame timing information, etc. Each synchronization signal block has a pre-determined time-domain position, where the time-domain position may also be referred to as a candidate synchronization signal block. A plurality of synchronization signal blocks constitute a synchronization signal burst (SS-burst), or a synchronization signal block burst (SSB burst). A plurality of synchronization signal bursts constitute a synchronization signal burst set (SS-burst-set), or a synchronization signal block burst set (SSB burst set).

The reference signal, together with the synchronization signal block (or the synchronization signal block burst), is used to implement AGC adjustment and channel tracking (or AGC adjustment, channel tracking and measurement). The embodiment of the present disclosure does not limit types of the reference signal. In a possible implementation, the reference signal may be a channel state information-reference signal (CSI-RS), or a tracking reference signal (TRS), or a synchronization signal (SS), etc.

In the following, an exemplary application scenario of the embodiment of the present disclosure is described.

The method for determining a reference signal provided by the embodiment of the present disclosure can be executed by an apparatus for determining a reference signal provided by the embodiment of the present disclosure, and the apparatus for determining a reference signal provided by the embodiment of the present disclosure may be part of or all of a terminal device. FIG. 1 is a schematic diagram of an exemplary application scenario of an embodiment of the present disclosure. As shown in FIG. 1, the communication system includes: a network equipment and a user equipment. The network equipment and the user equipment can communicate by using one or more air interface technologies.

Network equipment: it may be a base station, or various radio access points, or may refer to a device in an access network which communicates with a user equipment through one or more sectors on an air interface. The base station may be used to convert the received air frames with Internet protocol (IP) packets, and act as a router between a wireless terminal and the rest of the access network, where the rest of the access network may include an IP network. The base station can also coordinate attribute management of the air interface. For example, the base station may be a base transceiver station (BTS) in a global system of mobile communication (GSM) or a code division multiple access (CDMA), or may also be a base station (NodeB, NB) in a wideband code division multiple access (WCDMA), or an evolutional base station (Evolutional Node B, eNB or eNB) in long term evolution (LTE), or a relay station or an access point, or a base station gNB in the future 5G network, which is not limited here.

User equipment: it is also referred to as a terminal device, where the terminal device may be a wireless terminal or a wired terminal, the wireless terminal can be a device that provides voice and/or other service data connectivity to users, a handheld device with wireless connection functions, or other processing devices connected to wireless modems. The wireless terminal can communicate with one or more core networks via a radio access network (RAN). The wireless terminal can be a mobile terminal, such as a mobile phone (or a "cellular" phone) and a computer with a mobile terminal, for example, portable, pocket-sized, hand-held, computer-built or vehicle-mounted mobile apparatuses, which exchange language and/or data with the radio access network. For example, a personal communication service (PCS) telephone, a cordless telephone, a session initiation protocol (SIP) telephone, a wireless local loop (WLL) station, a personal digital assistant (PDA) and other devices. The wireless terminal can also be referred to as a system, a subscriber unit, a subscriber station, a mobile station, a mobile, a remote station, a remote terminal, an access terminal, a user terminal, or a user agent, which is not limited here.

It should be noted that the above-mentioned communication system may be a long term evolution (LTE) communication system or other communication systems in the future, which is not limited here. A 5G communication system is taken as an example for description and introduction in the following disclosure.

Embodiment 1

Figure 2:
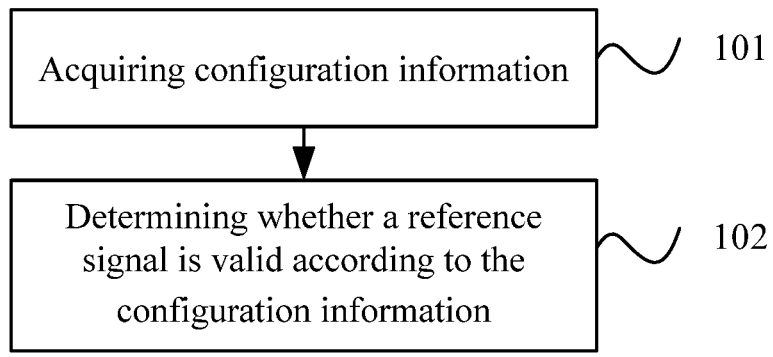
FIG. 2 is a schematic flowchart of a method for determining a reference signal provided by an embodiment of the present disclosure.

FIG. 2 is a schematic flowchart of a method for determining a reference signal provided by an embodiment of the present disclosure, where the method can be executed by an apparatus for determining a reference signal, and the apparatus can be implemented in manners of software and/or hardware, for example: the apparatus can be part of or all of the above-mentioned user equipment, and in the following, the user equipment is taken as an example of the executive subject for description of the method for determining a reference signal. As shown in FIG. 2, the method in the embodiment of the present disclosure may include:

S101: acquiring configuration information.

The implementation manner for a terminal to acquire the configuration information may be that a network equipment (such as a base station) sends the configuration information, and the embodiment of the present disclosure does not limit the specific implementation manners of acquiring the configuration information and the specific content of the configuration information. For example, the configuration information may be at least one of the following: a first preset offset, a second preset offset, a third preset offset, a fourth preset offset, a fifth preset offset, a sixth preset offset, a seventh preset offset, PO related information, PF related information, related information of a paging PDCCH monitoring occasion, related information of a synchronization signal block/synchronization signal block burst, etc., where the PO related information may include a start time point of a PO, an end time point of the PO, etc.; the PF related information may include a start time point of a PF, an end time point of the PF, etc.; and the related information of the paging PDCCH monitoring occasion may include: a start time point of a first paging PDCCH monitoring occasion, an end time point of a PDCCH monitoring occasion, etc. The paging indication PDCCH may indicate that whether the user equipment needs to monitor a paging PDCCH. The related information of the paging indication PDCCH monitoring occasion may include a start time point of a first paging indication PDCCH monitoring occasion, an end time point of a paging indication PDCCH monitoring occasion, etc. The embodiment of the present disclosure simply takes the specific content of the configuration information as an example, but is not limited thereto. In a possible implementation, the configuration information may also include a high-layer parameter or high-layer configuration information used in the following respective embodiments, etc., which will not be listed one by one in the embodiment of the present disclosure.

In a possible implementation, if the UE fails to detect the paging PDCCH, the UE determines that the reference signal is invalid. If the UE fails to detect the paging PDCCH in the PO, the UE determines that the reference signal before the PO or before starting of the PO is invalid.

S102: determining whether the reference signal is valid according to the configuration information.

Configuration of the reference signal may be configured according to a periodic signal, and not every period is valid, and the reference signal is valid only in some certain periods. For example, if the UE configures discontinuous reception (DRX), and the DRX period used is greater than 80 sm, for mobility measurement based on CSI-RS, the UE does not expect there is an available CSI-RS resource outside an active time. In such way, not only system overhead is reduced, but also UE power consumption is reduced. Therefore, it needs to be determined whether the reference signal is valid. The embodiment of the present disclosure does not limit specific implementation manners of determining whether the reference signal is valid according to the configuration information. For example, it can be determined whether the reference signal is valid according to specific information of the configuration information, and implementation manners of determining whether the reference signal is valid may be different when the specific information of the configuration information is different. Illustratively, if the configuration information is the first preset offset, it can be determined whether the reference signal is valid according to the first preset offset, and the embodiment of the present disclosure is not limited thereto.

In the embodiment of the present disclosure, determination of whether the reference signal is valid is implemented through the configuration information, system overhead is thus optimized. Furthermore, the UE simply needs to be waken up before a last synchronization signal block before a PO, so as to implement AGC adjustment and channel tracking (or AGC adjustment, channel tracking and measurement) through the reference signal and the last synchronization signal block (or synchronization signal block burst), thus effectively reducing a time period during which the UE is waken up in advance, thereby realizing common optimization of power saving of the UE and system overhead.

Embodiment 2

Figure 3:
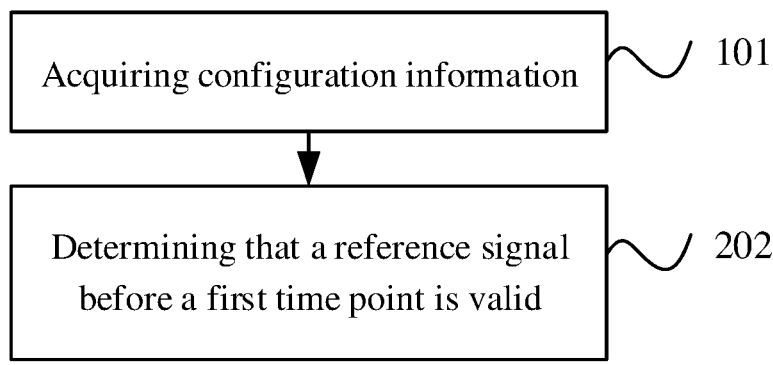
FIG. 3 is a schematic flowchart of a method for determining a reference signal provided by another embodiment of the present disclosure.

In a possible implementation, FIG. 3 is a schematic flowchart of a method for determining a reference signal provided by another embodiment of the present disclosure, where the method can be executed by an apparatus for determining a reference signal, and the apparatus can be implemented in manners of software and/or hardware, for example: the apparatus can be part of or all of the above-mentioned user equipment, and in the following, the user equipment is taken as an example of the executive subject for description of the method for determining a reference signal. As shown in FIG. 3, S102 in the embodiment of the present disclosure may include:

S202: determining that the reference signal before a first time point is valid.

The first time point is: a time point that a paging occasion (PO) starts, or a PF starts, or a first paging physical downlink control channel (PDCCH) monitoring occasion starts, or, a time point that the PO ends, or the PF ends, or a paging PDCCH monitoring occasion ends, or, a time point with a first preset offset from starting of the PO, or starting of the PF, or starting of the first paging PDCCH monitoring occasion, or, a time point with a second preset offset from ending of the PO, or ending of the PF, or ending of the paging PDCCH monitoring occasion.

The PF includes at least one PO, which is used for paging a UE group in a PF occasion. The PO occasion in a PF is used to page a sub-group in the UE group, where one UE group may include at least one sub-group, which is not limited by the embodiment of the present disclosure. UE groups having the same PF may use the same reference signal, and in a scenario that the PF includes a plurality of POs, overhead of the reference signal can be reduced.

The first paging PDCCH monitoring occasion may be the first paging PDCCH monitoring occasion in the PO. Generally, the first paging PDCCH monitoring occasion in the PO is configured by a high-layer parameter. In some circumstances, the start time point of the first paging PDCCH monitoring occasion may also be referred to as the start time point of the paging PDCCH monitoring occasion.

Figure 4:
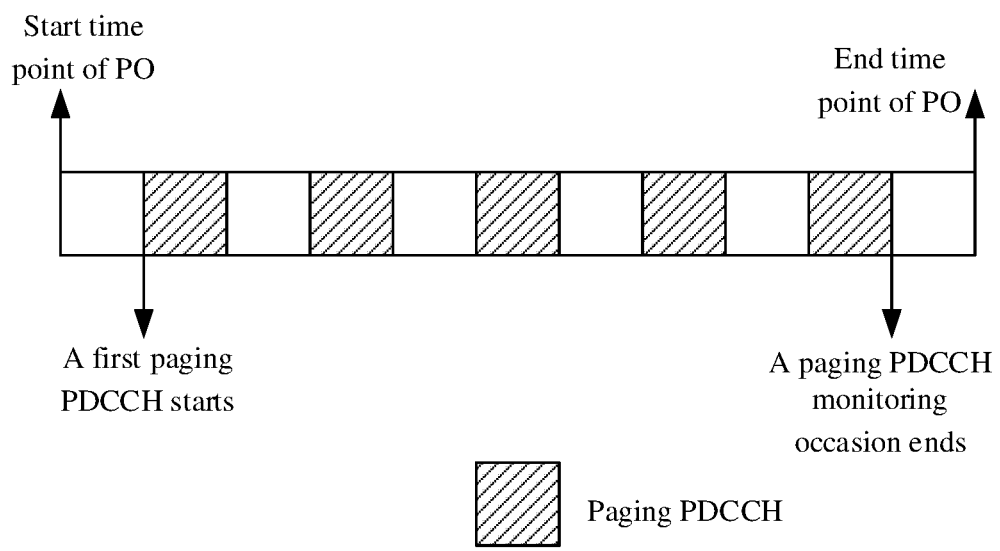
FIG. 4 is a schematic structural diagram of a paging occasion provided by an embodiment of the present disclosure.

FIG. 4 is a schematic structural diagram of a paging occasion provided by an embodiment of the present disclosure. As shown in FIG. 4, the paging occasion (PO) is a time-domain window, including a start time point and a duration of the PO, and the duration of the PO is generally one sub-frame, or one millisecond, or a plurality of paging PDCCH monitoring occasions, which is not limited by the embodiment of the present disclosure. For a given UE, the corresponding PO is consisted of a plurality of paging PDCCH monitoring occasions. The embodiment of the present disclosure does not limit the number of paging PDCCHs included in one PO, and it is only illustratively described in FIG. 4, and the embodiment of the present disclosure is not limited thereto. When the first time point is the start time point of the PO, or the start time point of the PF, or the start time point of the first paging PDCCH, the reference signal before the start time point of the PO, or the start time point of the PF, or the start time point of the first paging PDCCH is determined to be valid; when the first time point is a time point of ending of the PO, or ending of the PF, or ending of the paging PDCCH monitoring occasion, the reference signal before the end time point of the PO, or the end time point of the PF, or the end time point of the paging PDCCH monitoring occasion is valid.

In a possible implementation, when the first time point is a time point with a first preset offset from starting of the PO, or starting of the PF, or starting of the first paging PDCCH monitoring occasion, in a possible implementation, the reference signal before the time with the first preset offset from starting of the PO, or starting of the PF, or starting of the first paging PDCCH monitoring occasion is valid. When the first time point is a time point with a second preset offset from ending of the PO, or ending of the PF, or ending of the paging PDCCH monitoring occasion, the reference signal before the time with the second preset offset from ending of the PO, or ending of the PF, or ending of the paging PDCCH monitoring occasion is valid. The reference signal being valid before the first time point enables the user equipment to have a period of time for preparation or conversion to switch from measurement to paging PDCCH monitoring.

The first preset offset or the second preset offset may be a positive offset or a negative offset, which is not listed here by the embodiment of the present disclosure. For example, when the first time point is a time point with a first preset offset from starting of the PO, or starting of the PF, or starting of the first paging PDCCH monitoring occasion, in a possible implementation, the positive offset represents that the first time point is before the time of starting of the PO, or starting of the PF, or starting of the first paging PDCCH monitoring occasion, and the negative offset represents that the first time point is after the time of starting of the PO, or starting of the PF, or starting of the first paging PDCCH monitoring occasion, which is not limited by the embodiment of the present disclosure. It needs to be noted that, other preset offsets may also be the positive offsets or the negative offsets, and the "positive" or "negative" of the offset may represent a time-domain direction, which is not listed one by one in the embodiment of the present disclosure.

The first preset offset may also be referred to as a first minimum time gap. The second preset offset may also be referred to as a second minimum time gap. The first minimum time gap or the second minimum time gap may be a preset value. The first minimum time gap or the second minimum time gap may be related to a sub-carrier interval. The first minimum time gap or the second minimum time gap may also be a user equipment capability reported by the user equipment. The first minimum time gap or the second minimum time gap may be used by the user equipment to switch from measurement to paging PDCCH monitoring.

In a possible implementation, when the first time point is a time point with the first preset offset from starting of the PO, or starting of the PF, or starting of the first paging PDCCH monitoring occasion, or, a time point with the second preset offset from ending of the PO, or ending of the PF, or ending of the paging PDCCH monitoring occasion, the acquiring the configuration information in the method for determining a reference signal provided by the embodiment of the present disclosure may include: acquiring the first preset offset or the second preset offset.

By acquiring the first preset offset or the second preset offset, a time range of validity of the reference signal can be defined, thus enabling the base station to send the reference signal only in the valid time range, and in such way, the overhead of the network or system is reduced.

The embodiment of the present disclosure does not limit specific implementation manners of acquiring the first preset offset or the second preset offset, for example, the first preset offset or the second preset offset may be acquired through high-layer parameter configuration. The embodiment of the present disclosure does not limit specific offset values of the first preset offset and the second preset offset, for example, 1 millisecond, 2 milliseconds, 1 slot, 2 slots, etc.

In the present disclosure, a time point may be a symbol or a slot, and starting or a start time point may be a start symbol or a start slot, and ending or an end time point may be an end symbol or an end slot, which is not listed one by one in the embodiment of the present disclosure.

Embodiment 3

Figure 5:
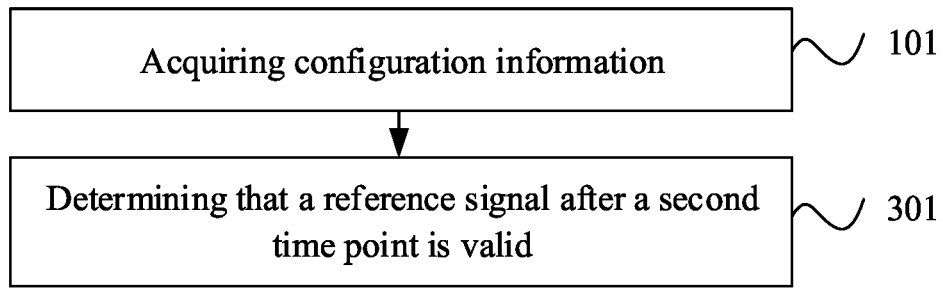
FIG. 5 is a schematic flowchart of a method for determining a reference signal provided by another embodiment of the present disclosure.

In a possible implementation, FIG. 5 is a schematic flowchart of a method for determining a reference signal provided by another embodiment of the present disclosure, where the method can be executed by an apparatus for determining a reference signal, and the apparatus can be implemented in manners of software and/or hardware, for example: the apparatus can be part of or all of the above-mentioned user equipment, and in the following, the user equipment is taken as an example of the executive subject for description of the method for determining a reference signal. As shown in FIG. 5, S102 in the embodiment of the present disclosure may include:

S301: determining that the reference signal after a second time point is valid.

The second time point is: a time point with a third preset offset from starting of a PO, or starting of a PF, or starting of a first paging PDCCH monitoring occasion, or, a time point with a fourth preset offset from ending of the PO, or ending of the PF, or ending of a paging PDCCH monitoring occasion.

The third preset offset or the fourth preset offset may be a positive offset or a negative offset, which is not listed here by the embodiment of the present disclosure. For example, when the second time point is a time point with a third preset offset from a start time point of the PO, or a start time point of the PF, or a start time point of the first paging PDCCH monitoring occasion, in a possible implementation, the positive offset represents that the second time point is before the start time point of the PO, or the start time point of the PF, or the start time point of the first paging PDCCH monitoring occasion, and the negative offset represents that the second time point is after the start time point of the PO, or the start time point of the PF, or the start time point of the first paging PDCCH monitoring occasion, and the embodiment of the present disclosure is not limited thereto. For example, when the second time point is a time point with a fourth preset offset from the end time point of the PO, or the end time point of the PF, or the end time point of the paging PDCCH monitoring occasion, in a possible implementation, the positive offset represents that the second time point is before the end time point of the PO, or the end time point of the PF, or the end time point of the paging PDCCH monitoring occasion, and the negative offset represents that the second time point is after the end time point of the PO, or the end time point of the PF, or the end time point of the paging PDCCH monitoring occasion, and the embodiment of the present disclosure is not limited thereto.

Based on this, in the method for determining a reference signal provided by the embodiment of the present disclosure, the acquiring the configuration information may include: acquiring the third preset offset or the fourth preset offset. The embodiment of the present disclosure does not limit specific implementation manners of acquiring the third preset offset or the fourth preset offset, in a possible implementation, the acquiring the third preset offset or the fourth preset offset includes: acquiring the third preset offset or the fourth preset offset through high-layer parameter configuration.

System flexibility can be effectively improved by acquiring the third preset offset or the fourth preset offset through the high-layer parameter.

In an embodiment, the method includes: determining that the reference signal after a second time point is valid, where the second time point is a start time point of a first paging indication PDCCH monitoring occasion, or an end time point of a paging indication PDCCH monitoring occasion.

In a possible implementation, the first paging indication PDCCH monitoring occasion is the first paging indication PDCCH monitoring occasion corresponding to the PO. Generally, the first paging indication PDCCH monitoring occasion corresponding to the PO is configured by a high-layer parameter. Generally, the first paging indication PDCCH monitoring occasion corresponding to the PO may be before the PO or before starting of the PO. In some circumstances, the start time point of the first paging indication PDCCH monitoring occasion may also be referred to as the start time point of the paging indication PDCCH monitoring occasion.

This is equal to the acquiring of the second time point through the high-layer parameter related to the paging indication PDCCH monitoring occasion, and signaling overhead can be reduced by acquiring the second time point through the high-layer parameter related to the paging indication PDCCH monitoring occasion.

The paging indication PDCCH monitoring occasion is before one PO, and is used to indicate the paging PDCCH monitoring occasion in the PO. Generally, a paging indication PDCCH window includes a plurality of paging indication PDCCH monitoring occasions. The offset corresponding to the first paging indication PDCCH monitoring occasion, or the offset corresponding to the start time point of the first paging indication PDCCH monitoring occasion represents that the UE starts to monitor the paging indication PDCCH after a time-domain position with the offset from the start time point of the PO or the start time point of the first paging PDCCH monitoring occasion.

In a possible implementation, there may be a plurality of reference signals after the second time point, and to avoid too many valid reference signals, the method for determining a reference signal provided by the embodiment of the present disclosure may further include: the reference signal is valid only when the reference signal appears for a first time point and/or a second time point, or the reference signal is valid only when the reference signal is fully valid for a first time and/or a second time.

The reference signal may have a plurality of appearing occasions after the second time point, hence, by restricting that the reference signal is valid only when the reference signal appears for a first time point and/or a second time point, overhead of the reference signal can be reduced, and power consumption of the user equipment is reduced simultaneously.

The reference signal may be a plurality of orthogonal frequency division multiplexing (OFDM) symbols, hence, where the reference signal is fully valid refers to that a plurality of OFDM symbols constituting the reference signal can be acquired consecutively, so as to avoid the situation that part of the reference signal is received and cannot be used. It is to be noted that, quantization of the preset offset may also be the OFDM symbol, hence it needs to be avoided that the time calculated according to the preset offset is among the plurality of OFDMs of the reference signal, which will destroy completeness of the reference signal. The reference signal being valid only when the reference signal is fully valid for the first time can reduce overhead of the reference signal. In an embodiment, the reference signal being valid when the reference signal is fully valid for both the first time and the second time can increase valid reference signal and improve performance.

It is to be noted that the method in Embodiment 2 and Embodiment 3/4/5 in the present disclosure can be used independently or in combination, which is not limited by the embodiment of the present disclosure. When Embodiment 2 and Embodiment 3/4/5 are used in combination, in the process of determining whether the reference signal is valid, the reference signal before the first time point and after the second/third/fourth time point can be determined to be valid.

Embodiment 4

Figure 6:
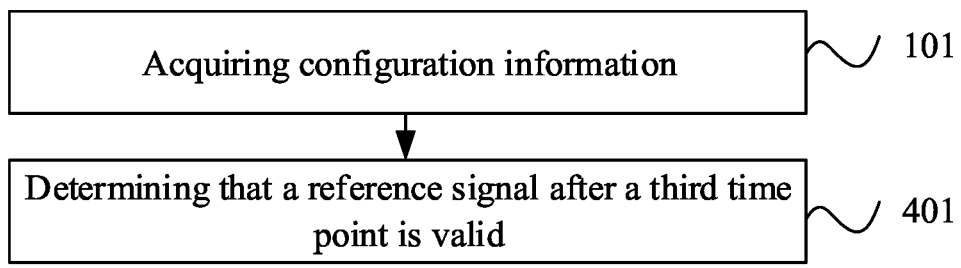
FIG. 6 is a schematic flowchart of a method for determining a reference signal provided by another embodiment of the present disclosure.

In a possible implementation, the reference signal may be before or after the paging indication PDCCH monitoring occasion, hence, the reference signal can be triggered through the paging indication PDCCH. FIG. 6 is a schematic flowchart of a method for determining a reference signal provided by an embodiment of the present disclosure, where the method can be executed by an apparatus for determining a reference signal, and the apparatus can be implemented in manners of software and/or hardware, for example: the apparatus can be part of or all of the above-mentioned user equipment, and in the following, the user equipment is taken as an example of the executive subject for description of the method for determining a reference signal. As shown in FIG. 6, the S102 in the embodiment of the present disclosure may include:

S401: determining that the reference signal after a third time point is valid.

The third time point is: a time point with a fifth preset offset from starting of a first paging indication PDCCH monitoring occasion; or, a time point with a sixth preset offset from ending of a paging indication PDCCH monitoring occasion. In such way, the user equipment is switched from monitoring to measurement after a time point interval from the paging indication PDCCH. The fifth preset offset may also be referred to as a fifth minimum time gap. The sixth preset offset may also be referred to as a sixth minimum time gap.

In the embodiment of the present disclosure, determining that the reference signal after the third time point is valid is beneficial for the UE to derive a time-domain position of the valid reference signal according to the paging indication PDCCH monitoring occasion, and ensures that the UE can process the reference signal before monitoring the paging indication PDCCH.

The embodiment of the present disclosure does not limit specific values of the fifth preset offset and the sixth preset offset, for example, the fifth preset offset or the sixth preset offset may be 1 millisecond, 2 milliseconds, 1 slot, 2 slots, etc.

The fifth preset offset and the sixth preset offset may be positive offsets or negative offsets, which is not listed here by the embodiment of the present disclosure. In a possible implementation, the negative offset represents that the third time point is after the start time point of the paging indication PDCCH monitoring occasion, or, after the end time point of the paging indication PDCCH monitoring occasion. In a possible implementation, the positive offset represents that the third time point is before the start time point of the first paging indication PDCCH monitoring occasion, or, before the end time point of the paging indication PDCCH monitoring occasion. The embodiment of the present disclosure is not limited thereto.

Based on this, in the method for determining a reference signal provided by the embodiment of the present disclosure, the acquiring the configuration information may include: acquiring the fifth preset offset or the sixth preset offset. The embodiment of the present disclosure does not limit specific implementation manners of acquiring the fifth preset offset or the sixth preset offset, in a possible implementation, the acquiring the fifth preset offset or the sixth preset offset includes: acquiring the fifth preset offset or the sixth preset offset through high-layer parameter configuration.

System flexibility can be effectively improved by directly acquiring the fifth preset offset or the sixth preset offset through the high-layer parameter.

In a possible implementation, there may be a plurality of reference signals after the third time point, and to avoid too many valid reference signals, the method for determining a reference signal provided by the embodiment of the present disclosure may further include: the reference signal is valid only when the reference signal appears for a first time point and/or a second time point, or the reference signal is valid only when the reference signal is fully valid for a first time and/or a second time.

The method in Embodiment 4 and other embodiments in the present disclosure can be used independently or in combination, which is not limited by the embodiment of the present disclosure.

Embodiment 5

Figure 7:
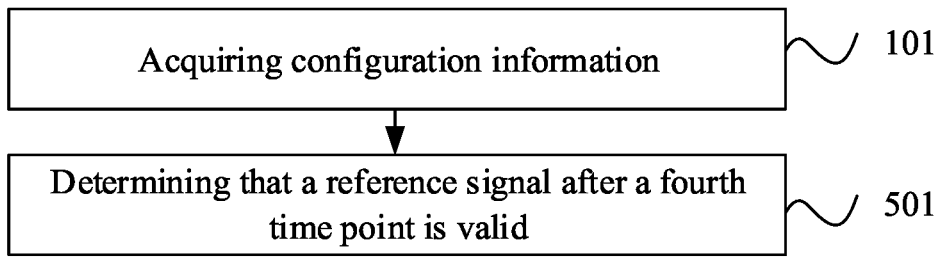
FIG. 7 is a schematic flowchart of a method for determining a reference signal provided by another embodiment of the present disclosure.

In a possible implementation, FIG. 7 is a schematic flowchart of a method for determining a reference signal provided by another embodiment of the present disclosure, where the method can be executed by an apparatus for determining a reference signal, and the apparatus can be implemented in manners of software and/or hardware, for example: the apparatus can be part of or all of the above-mentioned user equipment, and in the following, the user equipment is taken as an example of the executive subject for description of the method for determining a reference signal. As shown in FIG. 7, S102 in the embodiment of the present disclosure may include:

S501: determining that the reference signal after a fourth time point is valid.

The fourth time point is: a time point of a synchronization signal block burst closest to starting of a PO, or starting of a PF, or a first paging PDCCH monitoring occasion, or, a time point with a seventh preset offset from a time point of a synchronization signal block burst closest to starting of a PO, or starting of a PF, or a first paging PDCCH monitoring occasion.

Each synchronization signal block has a pre-determined time-domain position, where the time-domain position may also be referred to as a candidate synchronization signal block. A plurality of synchronization signal blocks constitute a synchronization signal burst, or a synchronization signal block burst. A plurality of synchronization signal bursts constitute a synchronization signal burst set, or a synchronization signal block burst set. The embodiment of the present disclosure does not limit the time of the synchronization signal block burst, and in a possible implementation, the time of the synchronization signal block burst may be any one of the following: an end time point of the synchronization signal block or a candidate synchronization signal block in a half frame or a frame, or, an end time point of a half frame or a frame including the synchronization signal block or the candidate synchronization signal block.

In the embodiment of the present disclosure, directly determining the validity of the reference signal through the synchronization signal block configuration can effectively reduce the signaling overhead. Specifically, since the UE in the idle mode needs to measure the synchronization signal block by default, the closest synchronization signal block is used by default, which is more in conformity with general operations of the UE, and no additional signaling needs to be introduced.

Furthermore, when the fourth time point is the time with the seventh preset offset from the time of the synchronization signal block burst closest to the starting of the PO, or the starting of the PF, or the first paging PDCCH monitoring occasion, in the method for determining a reference signal provided by the embodiment of the present disclosure, the acquiring the configuration information may include: acquiring the seventh preset offset.

The embodiment of the present disclosure does not limit the acquiring manner or specific value of the seventh preset offset, for example, the seventh preset offset is 1 millisecond, 2 milliseconds, 1 slot, 2 slots, etc. In the embodiment of the present disclosure, the UE determines that the reference signal after the fourth time point is valid, which is beneficial for that the reference signal is valid only near the synchronization signal block burst closest to the starting of the PO, or the starting of the PF, or the starting of the first paging PDCCH monitoring occasion, and is beneficial for the UE to use the closest synchronization signal block burst and the reference to perform AGC adjustment and channel tracking (or AGC adjustment, channel tracking and measurement).

In a possible implementation, the acquiring the seventh preset offset includes: acquiring the seventh preset offset through high-layer parameter configuration, which is not limited by the embodiment of the present disclosure.

In a possible implementation, there may be a plurality of reference signals after the fourth time point, and to avoid too many valid reference signals, the method for determining a reference signal provided by the embodiment of the present disclosure may further include: the reference signal is valid only when the reference signal appears for a first time point and/or a second time point, or the reference signal is valid only when the reference signal is fully valid for a first time and/or a second time.

The method in Embodiment 5 and other embodiments in the present disclosure can be used independently or in combination, which is not limited by the embodiment of the present disclosure.

Embodiment 6

Figure 8:
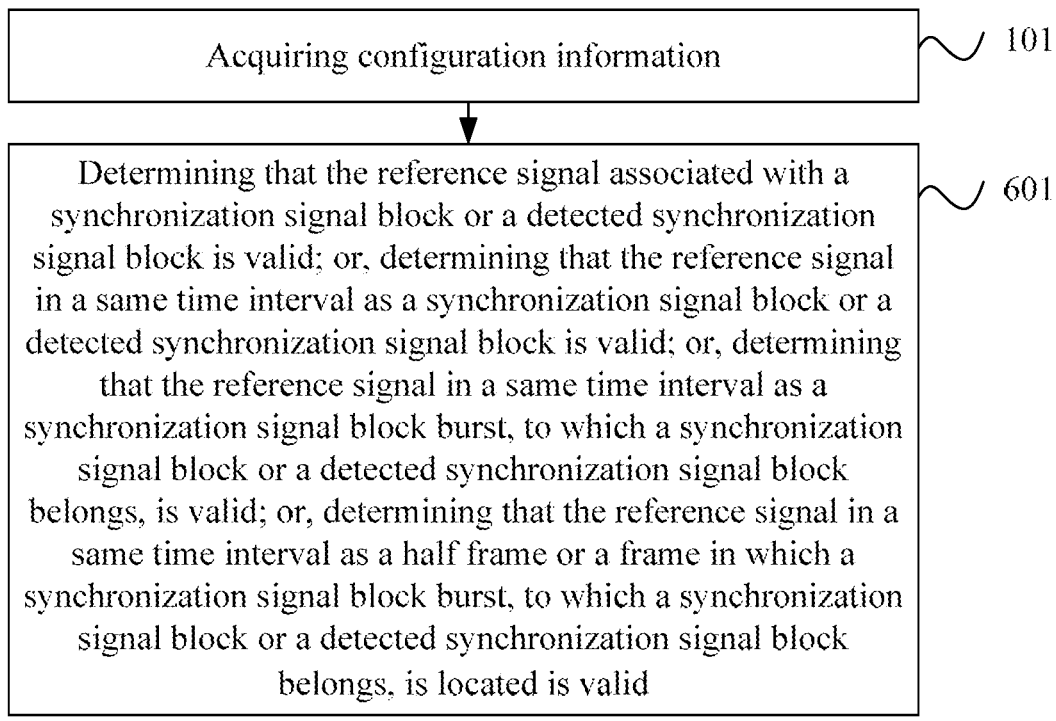
FIG. 8 is a schematic flowchart of a method for determining a reference signal provided by another embodiment of the present disclosure.

In a possible implementation, FIG. 8 is a schematic flowchart of a method for determining a reference signal provided by another embodiment of the present disclosure, where the method can be executed by an apparatus for determining a reference signal, and the apparatus can be implemented in manners of software and/or hardware, for example: the apparatus can be part of or all of the above-mentioned user equipment, and in the following, the user equipment is taken as an example of the executive subject for description of the method for determining a reference signal. As shown in FIG. 8, S102 in the embodiment of the present disclosure may include:

S601: determining that the reference signal associated with a synchronization signal block or a detected synchronization signal block is valid; or, determining that the reference signal in a same time interval as a synchronization signal block or a detected synchronization signal block is valid; or, determining that the reference signal in a same time interval as a synchronization signal block burst, to which a synchronization signal block or a detected synchronization signal block belongs, is valid; or, determining that the reference signal in a same time interval as a half frame or a frame in which a synchronization signal block burst, to which a synchronization signal block or a detected synchronization signal block belongs, is located is valid.

Beam sweeping is adopted when the base station sends the synchronization signal block, that is, the base station sends the synchronization signal block at different time-domain positions through different beams. Correspondingly, the user equipment can measure different synchronization signal blocks (possibly on different beams) and sense which synchronization signal block has the strongest signal, and this synchronization signal block can be called a detected synchronization signal block, and this process can be called detecting the synchronization signal block. The user equipment determines that the reference signal associated with the synchronization signal block or the detected synchronization signal block is valid through the synchronization signal block or the detected synchronization signal block. In the embodiment of the present disclosure, the base station may send the reference signal, or may not send the reference signal, and the UE determines whether the reference signal is sent by detecting whether the synchronization signal block is sent. Specifically, the base station may set the period of the reference signal to be consistent with the period of the synchronization signal block, the period of the synchronization signal block burst, the half-frame period of the synchronization signal block (periodicity of the half frames for reception of the SS/PBCH blocks, provided by the high-layer parameter ssb-periodicityServingCell), or the frame-period of the synchronization signal block, and then the base station configures the reference signal to be associated with one synchronization signal block (index), and in such way, the UE can determine whether the reference signal is sent by detecting whether the synchronization signal block is sent. The associated relationship may be a relationship of Quasi Co-Location (QCL), where the synchronization signal block (or detected synchronization signal block) associates with the reference signal may also be referred to as that the synchronization signal block (or detected synchronization signal block) has a QCL relationship with the reference signal. The reference signal associated with the synchronization signal block (or detected synchronization signal block) may also be referred to as the reference signal having the QCL relationship with the synchronization signal block (or detected synchronization signal block). The synchronization signal block (or detected synchronization signal block) associated with the reference signal may also be referred to as the synchronization signal block (or detected synchronization signal block) having the QCL relationship with the reference signal.

In a possible implementation, the base station can configure that one reference signal transmission occasion may be close to one synchronization signal block in the time-domain, for example, in a discovery reference signal (DRS) or a discovery burst. Therefore, the method for determining a reference signal provided by the embodiment of the present disclosure may include: a user equipment determining that a reference signal in the same time interval (for example, the same slot, or sub-frame, or frame) as a synchronization signal block or a detected synchronization signal block is valid; or, determining that a reference signal in the same time interval (for example, the same slot, or sub-frame, or frame) as a synchronization signal block burst, to which a synchronization signal block or a detected synchronization signal block belongs, is valid; or, determining that a reference signal in the same discovery reference signal as a synchronization signal block burst, to which a synchronization signal block or a detected synchronization signal block belongs, is valid; or, determining that a reference signal in the same discovery burst as a synchronization signal block burst, to which a synchronization signal block or a detected synchronization signal block belongs, is valid; or, determining that a reference signal in the same time interval as a half-frame or a frame in which a synchronization signal block burst, to which a synchronization signal block or a detected synchronization signal block belongs, is located is valid; or, determining that a reference signal in the same frame as a half-frame in which a synchronization signal block burst, to which a synchronization signal block or a detected synchronization signal block belongs, is located is valid.

In a possible implementation, the base station can configure that one reference signal transmission occasion may be close to one PDSCH in the time-domain, for example, in a slot. Therefore, the method for determining a reference signal provided by the embodiment of the present disclosure may include: a user equipment determining that a reference signal in the same time interval (for example, the same slot or sub-frame or frame) as a PDSCH is valid; or, determining that a reference signal in the same time interval (for example, the same slot or sub-frame or frame) as a PDCCH scheduling a PDSCH is valid; or, determining that a reference signal in the same time interval (for example, the same slot or sub-frame or frame) as a CORESET (Control Resource Set) corresponding to a PDCCH scheduling a PDSCH is valid. The PDSCH may be a PDSCH carrying SIB1 (System Information Block 1), or other PDSCHs. When the PDSCH is the PDSCH carrying SIB1, the PDCCH scheduling the PDSCH is a Type0-PDCCH or a PDCCH corresponding to a Type0-PDCCH CSS (Common Search Space).

In a possible implementation, the base station can configure that one reference signal transmission occasion may be in one COT (channel occupancy time), for example, in a slot. Therefore, the method for determining a reference signal provided by the embodiment of the present disclosure may include: a user equipment determining a reference signal in one COT is valid. Specifically, the COT may be a time interval (for example, a slot or a sub-frame or a frame) where a synchronization signal block (or a detected synchronization signal block) associated with the reference signal is located. Or, the COT may be a time interval (for example, a slot or a sub-frame or a frame) where a PDCCH associated with a synchronization signal block (or a detected synchronization signal block) associated with the reference signal is located. Or, the COT may be a time interval (for example, a slot or a sub-frame or a frame) where a PDSCH scheduled by a PDCCH associated with a synchronization signal block (or a detected synchronization signal block) associated with the reference signal is located. Or, the COT may be a discovery burst. Or, the COT may be a time interval (for example, a slot or a sub-frame or a frame) where a discovery burst is located. Or, the COT may be a time interval (for example, a slot or a sub-frame or a frame) where a PDSCH is located. Or, the COT may be a time interval (for example, a slot or a sub-frame or a frame) where a PDCCH scheduling a PDSCH is located. Or, the COT may be a time interval (for example, a slot or a sub-frame or a frame) where a CORESET (Control Resource Set) corresponding to a PDCCH scheduling a PDSCH is located. The PDSCH may be a PDSCH carrying SIB1 (System Information Block 1), or other PDSCHs. When the PDSCH is the PDSCH carrying SIB1, the PDCCH scheduling the PDSCH is a Type0-PDCCH or a PDCCH corresponding to a Type0-PDCCH CSS (Common Search Space).

In a possible implementation, the base station can configure that one reference signal transmission occasion may be in a downlink transmission burst, for example, in a slot. Therefore, the method for determining a reference signal provided by the embodiment of the present disclosure may include: a user equipment determining a reference signal in one downlink transmission burst is valid. Specifically, the downlink transmission burst may be a time interval (for example, a slot or a sub-frame or a frame) where a synchronization signal block (or a detected synchronization signal block) associated with the reference signal is located. Or, the downlink transmission burst may be a time interval (for example, a slot or a sub-frame or a frame) where a PDCCH associated with a synchronization signal block (or a detected synchronization signal block) associated with the reference signal is located. Or, the downlink transmission burst may be a time interval (for example, a slot or a sub-frame or a frame) where a PDSCH scheduled by a PDCCH associated with a synchronization signal block (or a detected synchronization signal block) associated with the reference signal is located. Or, the downlink transmission burst may be a discovery burst. Or, the downlink transmission burst may be a time interval (for example, a slot or a sub-frame or a frame) where a discovery burst is located. Or, the downlink transmission burst may be a time interval (for example, a slot or a sub-frame or a frame) where a PDSCH is located. Or, the downlink transmission burst may be a time interval (for example, a slot or a sub-frame or a frame) where a PDCCH scheduling a PDSCH is located. Or, the downlink transmission burst may be a time interval (for example, a slot or a sub-frame or a frame) where a CORESET (Control Resource Set) corresponding to a PDCCH scheduling a PDSCH is located. The PDSCH may be a PDSCH carrying SIB1 (System Information Block 1), or other PDSCHs. When the PDSCH is the PDSCH carrying SIB1, the PDCCH scheduling the PDSCH is a Type0-PDCCH or a PDCCH corresponding to a Type0-PDCCH CSS (Common Search Space).

The embodiment of the present disclosure does not limit the specific length of time of the time interval, and in a possible implementation, the time interval is X millisecond(s), X slot(s) or X symbol(s), where X is a positive integer. The embodiment of the present disclosure does not limit the configuring manner of the time interval, and in a possible implementation, the time interval is a length of time configured by a high-layer parameter.

In a possible implementation, there may be a plurality of reference signals, and to avoid too many valid reference signals, the method for determining a reference signal provided by the embodiment of the present disclosure may further include: the reference signal is valid only when the reference signal appears for a first time point and/or a second time point, or the reference signal is valid only when the reference signal is fully valid for a first time and/or a second time.

The method in Embodiment 6 and other embodiments in the present disclosure can be used independently or in combination, which is not limited by the embodiment of the present disclosure.

The apparatus embodiments of the present disclosure will be described in the following, the apparatus is configured to execute the method embodiments of the present disclosure. For details not disclosed in the apparatus embodiments of the present disclosure, reference may be made to the method embodiments of the present disclosure.

Figure 9:
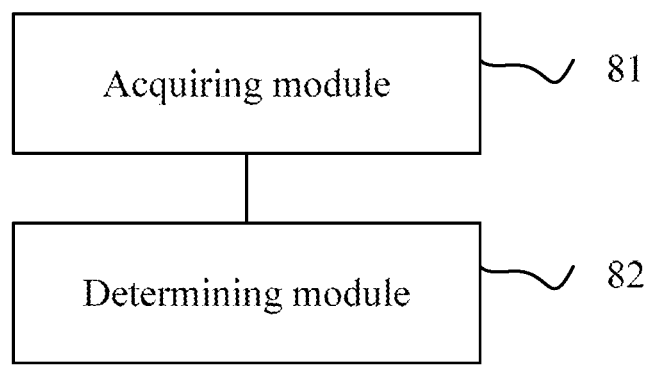
FIG. 9 is a schematic structural diagram of an apparatus for determining a reference signal provided by an embodiment of the present disclosure.

FIG. 9 is a schematic structural diagram of an apparatus for determining a reference signal provided by an embodiment of the present disclosure. The apparatus can be implemented in manners of software and/or hardware, as shown in FIG. 9. The apparatus for determining a reference signal provided by the embodiment of the present disclosure may include:

an acquiring module 81, configured to acquire configuration information; a determining module 82, configured to determine whether the reference signal is valid according to the configuration information.

In a possible implementation, the determining module 82 is specifically configured to:

determine that the reference signal before a first time point is valid, where the first time point is: a time point that a paging occasion (PO) starts, or a PF starts, or a first paging physical downlink control channel (PDCCH) monitoring occasion starts, or, a time point that the PO ends, or the PF ends, or a paging PDCCH monitoring occasion ends, or, a time point with a first preset offset from starting of the PO, or starting of the PF, or starting of the first paging PDCCH monitoring occasion, or, a time point with a second preset offset from ending of the PO, or ending of the PF, or ending of the paging PDCCH monitoring occasion.

In an embodiment, the acquiring module 81 is configured to:

acquire the first preset offset or the second preset offset.

In an embodiment, the acquiring module 81 is specifically configured to:

acquire the first preset offset or the second preset offset through high-layer parameter configuration.

In a possible implementation, the determining module 82 is specifically configured to:

determine that the reference signal after a second time point is valid, where the second time point is: a time point with a third preset offset from starting of a PO, or starting of a PF, or starting of a first paging PDCCH monitoring occasion, or, a time point with a fourth preset offset from ending of the PO, or ending of the PF, or ending of a paging PDCCH monitoring occasion.

In an embodiment, the acquiring module 81 is configured to: acquire the third preset offset or the fourth preset offset.

In an embodiment, the determining module 82 is specifically configured to: determine that the reference signal after a second time point is valid, where the second time point is a start time point of a first paging indication PDCCH monitoring occasion, or an end time point of a paging indication PDCCH monitoring occasion.

In an embodiment, the acquiring module 81 is specifically configured to: acquire the third preset offset or the fourth preset offset through high-layer parameter configuration.

In an embodiment, the determining module 82 is further configured to: if a paging indication PDCCH is not detected, determine that the reference signal is not valid.

In an embodiment, the reference signal is valid only when the reference signal is fully valid for a first time and/or a second time.

In a possible implementation, the determining module 82 is specifically configured to:

determine that the reference signal after a third time point is valid, where the third time point is: a time point with a fifth preset offset from a start time point of a first paging indication PDCCH monitoring occasion; or, a time point with a sixth preset offset from an end time point of a paging indication PDCCH monitoring occasion.

In an embodiment, the acquiring module 81 is configured to: acquire the fifth preset offset or the sixth preset offset.

In an embodiment, the acquiring module 81 is specifically configured to: acquire the fifth preset offset or the sixth preset offset through high-layer parameter configuration.

In an embodiment, the reference signal is valid only when the reference signal is fully valid for a first time and/or a second time.

In a possible implementation, the determining module 82 is specifically configured to:

determine that the reference signal after a fourth time point is valid, where the fourth time point is: a time point of a synchronization signal block burst closest to starting of a PO, or starting of a PF, or a first paging PDCCH monitoring occasion, or, a time point with a seventh preset offset from a time point of a synchronization signal block burst closest to starting of a PO, or starting of a PF, or a first paging PDCCH monitoring occasion.

In an embodiment, the time of the synchronization signal block burst is any one of the following:

an end time point of a synchronization signal block or a candidate synchronization signal block in a half frame or a frame, or, an end time point of a half frame or a frame including a synchronization signal block or a candidate synchronization signal block.

In an embodiment, the acquiring module 81 is configured to: acquire the seventh preset offset.

In an embodiment, the acquiring module 81 is specifically configured to: acquire the seventh preset offset through high-layer parameter configuration.

In an embodiment, the reference signal is valid only when the reference signal is fully valid for a first time and/or a second time.

In an embodiment, the determining module 82 is specifically configured to:

determine that a reference signal associated with a synchronization signal block or a detected synchronization signal block is valid; or, determine that a reference signal in a same time interval as a synchronization signal block or a detected synchronization signal block is valid; or, determine that a reference signal in a same time interval as a synchronization signal block burst, to which a synchronization signal block or a detected synchronization signal block belongs, is valid; or, determine that a reference signal in a same time interval as a half frame or a frame in which a synchronization signal block burst, to which a synchronization signal block or a detected synchronization signal block belongs, is located is valid.

In an embodiment, the time interval is a length of time configured by a high-layer parameter.

In an embodiment, the time interval is X milliseconds or X slots, where X is a positive integer.

In an embodiment, the reference signal is valid only when the reference signal is fully valid for a first time and/or a second time.

The apparatus embodiments provided by the present disclosure are only illustrative, and the module division in FIG. 9 is only a division of logical functions, and there may be other division manners in actual implementations. For example, a plurality of modules can be combined together or be integrated into another system. The modules can be coupled with each other through some interfaces, which are usually electrical communication interfaces, but it is not excluded that they may be mechanical interfaces or other interfaces. Therefore, the modules described as separate components may or may not be physically separated, and may be located in one place or distributed in different positions of the same or different devices.

The apparatus for determining a reference signal shown in the embodiment of the present disclosure can be a chip, a hardware module, a processor, etc. Certainly, the apparatus for determining a reference signal can take other forms, and the embodiment of the present disclosure is not particularly limited thereto.

Figure 10:
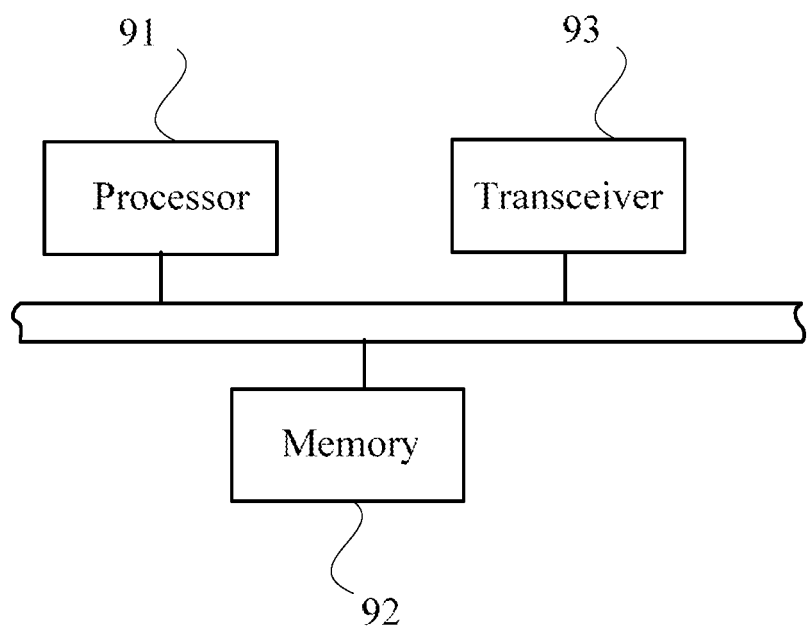
FIG. 10 is a schematic structural diagram of an electronic device provided by an embodiment of the present disclosure.

FIG. 10 is a schematic structural diagram of an electronic device provided by an embodiment of the present disclosure. As shown in FIG. 10, the electronic device includes:

a processor 91, a memory 92, a transceiver 93 and a computer program; where the transceiver 93 implements data transmission with other devices, the computer program is stored in the memory 92 and is configured to be executed by the processor 91, and the computer program includes instructions for performing the above method for determining a reference signal, for the content and effect thereof, reference can be made to the method embodiments.

In addition, the embodiment of the present disclosure further provides a computer-readable storage medium, storing a computer-executable instruction, and when at least one processor in a user equipment executes the computer-executable instruction, the user equipment performs the above-mentioned various possible methods.

The computer-readable medium includes computer storage medium and communication medium, where the communication medium includes any medium that facilitates the transfer of computer programs from one place to another. The storage medium can be any available medium that can be accessed by general-purpose or special-purpose computers. An exemplary storage medium is coupled to a processor so that the processor can read information from and write information into the storage medium. Certainly, the storage medium may also be a part constituting the processor. The processor and the storage medium may be located in an ASIC. In addition, the ASIC may be located in the user equipment. Certainly, the processor and the storage medium can also exist as discrete components in the communication device.

Those of ordinary skills in the art may understand: all or part of the steps to realize the above-mentioned method embodiments can be completed by hardware related to program instructions. The above mentioned program can be stored in a computer-readable storage medium. When the program is executed, the steps including the above method embodiments are executed; the above-mentioned storage medium includes: a ROM, a RAM, a magnetic disk or an optical disk and other mediums that can store program codes.

Finally, it should be noted that: the above embodiments are only used to illustrate the technical solutions of the present disclosure, but not to limit them; although the present disclosure has been described in detail with reference to the above-mentioned embodiments, those skilled in the art should understand that they can still modify the technical solutions described in the above-mentioned embodiments, or equivalently replace some or all of the technical features; these modifications or substitutions do not make the essence of the corresponding technical solutions depart from the scope of the technical solutions of the embodiments of the present disclosure.

The invention claimed is:

1. A method for determining a reference signal, comprising:
   acquiring configuration information; and
   determining whether the reference signal is valid according to the configuration information;
   wherein the determining whether the reference signal is valid comprises:
   determining that the reference signal after a second time point is valid, wherein the second time point is a time point with a third preset offset from starting of a paging frame (PF).

2. The method according to claim 1, wherein the determining whether the reference signal is valid further comprises:
   determining that the reference signal before a first time point is valid;
   wherein the first time point is:

a time point that a paging occasion (PO) starts, or PF starts, or a first paging physical downlink control channel (PDCCH) monitoring occasion starts, or, a time point that the PO ends, or the PF ends, or a paging PDCCH monitoring occasion ends, or, a time point with a first preset offset from starting of the PO, or starting of the PF, or starting of the first paging PDCCH monitoring occasion, or, a time point with a second preset offset from ending of the PO, or ending of the PF, or ending of the paging PDCCH monitoring occasion.

3. The method according to claim 2, wherein the acquiring the configuration information comprises:
acquiring the first preset offset or the second preset offset.

4. The method according to claim 3, wherein the acquiring the first preset offset or the second preset offset comprises:
acquiring the first preset offset or the second preset offset through high-layer parameter configuration.

5. The method according to claim 1, wherein the acquiring the configuration information comprises:
acquiring the third preset offset.

6. The method according to claim 5, wherein the acquiring the third preset offset comprises:
acquiring the third preset offset through high-layer parameter configuration.

7. The method according to claim 1, wherein the determining whether the reference signal is valid further comprises:
determining that the reference signal after a second time point is valid, wherein the second time point is an end time point of a paging indication physical downlink control channel (PDCCH) monitoring occasion, or a start time point of a first paging indication PDCCH monitoring occasion.

8. The method according to claim 7, further comprising:
after a paging indication PDCCH is not detected, determining that the reference signal is not valid.

9. The method according to claim 1, wherein the reference signal is valid only when the reference signal is completely valid for at least one of a first time or a second time.

10. The method according to claim 1, wherein the determining whether the reference signal is valid further comprises:
determining that the reference signal after a third time point is valid;
wherein the third time point is:
a time point with a fifth preset offset from starting of a first paging indication physical downlink control channel (PDCCH) monitoring occasion; or,
a time point with a sixth preset offset from ending of a paging indication PDCCH monitoring occasion.

11. The method according to claim 10, wherein the acquiring the configuration information comprises:
acquiring the fifth preset offset or the sixth preset offset.

12. The method according to claim 11, wherein the acquiring the fifth preset offset or the sixth preset offset comprises:
acquiring the fifth preset offset or the sixth preset offset through high-layer parameter configuration.

13. The method according to claim 10, wherein the reference signal is valid only when the reference signal is completely valid for at least one of a first time or a second time.

14. The method according to claim 1, wherein the determining whether the reference signal is valid further comprises:

determining that the reference signal after a fourth time point is valid;
wherein the fourth time point is:
a time point of a synchronization signal block burst closest to starting of a paging occasion (PO), or starting of a PF, or a first paging physical downlink control channel (PDCCH) monitoring occasion, or,
a time point with a seventh preset offset from a time point of a synchronization signal block burst closest to starting of a PO, or starting of a PF, or a first paging PDCCH monitoring occasion.

15. The method according to claim 14, wherein the time point of the synchronization signal block burst is any one of the following:
an end time point of a synchronization signal block or a candidate synchronization signal block in a half frame or a frame, or, an end time point of a half frame or a frame comprising a synchronization signal block or a candidate synchronization signal block.

16. The method according to claim 14, wherein the acquiring the configuration information comprises:
acquiring the seventh preset offset.

17. The method according to claim 1, wherein the determining whether the reference signal is valid further comprises:
determining that the reference signal associated with a synchronization signal block or a detected synchronization signal block is valid; or,
determining that the reference signal in a same time interval as a synchronization signal block or a detected synchronization signal block is valid; or,
determining that the reference signal in a same time interval as a synchronization signal block burst, to which a synchronization signal block or a detected synchronization signal block belongs, is valid; or,
determining that the reference signal in a same time interval as a half frame or a frame in which a synchronization signal block burst, to which a synchronization signal block or a detected synchronization signal block belongs, is located is valid.

18. An apparatus for determining a reference signal, comprising:
at least one processor; and
a memory communicatively connected to the at least one processor; wherein
the memory stores an instruction executable by the at least one processor, and the instruction is executed by the at least one processor to cause the at least one processor to:
acquire configuration information; and
determine whether the reference signal is valid according to the configuration information;
wherein the at least one processor is further caused to:
determine that the reference signal after a second time point is valid, wherein the second time point is a time point with a third preset offset from starting of a paging frame (PF).

19. A non-transitory computer-readable storage medium storing a computer instruction, wherein the computer instruction is used to cause a computer to:
acquire configuration information; and
determine whether the reference signal is valid according to the configuration information;
wherein the computer is further caused to:

determine that the reference signal after a second time point is valid, wherein the second time point is a time point with a third preset offset from starting of a paging frame (PF).

* * * * *